United States Patent Office 2,880,180
Patented Mar. 31, 1959

2,880,180

PROPARGYL SULFIDE AS A CORROSION INHIBITOR IN ACIDIC SOLUTIONS

Gerald L. Foster and Billy D. Oakes, Tulsa, Okla., assignors to The Dow Chemical Company, Midland, Mich., a corporation of Delaware No Drawing. Application September 10, 1956
Serial No. 608,716

2 Claims. (Cl. 252—395)

This invention relates to a new compound, propargyl sulfide, and to its use in inhibiting the acid corrosion of ferrous metals.

An object of this invention is to provide, as new compositions of matter, propargyl sulfide, corrosion inhibitors comprising propargyl sulfide, and acidic solutions inhibited against the corrosion of metals comprising propargyl sulfide.

A particular use for which propargyl sulfide is outstanding is as a corrosion inhibitor for use in aqueous acids for the protection of ferrous metals. As a corrosion inhibitor, it is effective in aqueous non-oxidizing acids, including $H_2SO_4$, HCl, $H_3PO_4$, $CH_3COOH$ and the like. By "aqueous acid" we mean acid in the presence of water and do not mean to exclude the presence of other substances. For such use, only a very small amount of the sulfide is needed. As little as a few thousandths of one percent in an acid solution is sufficient to reduce significantly the rate at which ferrous metals in contact with the solution are corroded.

The practice of the invention is illustrated by the following examples.

EXAMPLE I.—PREPARATION OF PROPARGYL SULFIDE

Two moles of KSH were prepared by dissolving 2 m. of KOH (112 g.) in 150 ml. of water and bubbling $H_2S$ into the solution until saturated. This solution was slowly added to 2 m. of propargyl bromide. The heat of reaction was sufficient to bring the mixture to the boiling point, after which heat was applied to maintain reflux for 2 hrs. The KBr formed was filtered out (67 percent yield), after which the organic layer was separated, dried and distilled under reduced pressure such that it distilled at room temperature. In this way a water-white product having the characteristic odor of sulfides was obtained. The yield of sulfide was slightly lower than that of KBr because of the formation of a polymeric residue. It had B.P., 72 to 74° C. at 32 mm., $n_D^{22}$, 1.521, and specific gravity, 1.005 at 25° C. The carbon, hydrogen, sulfur analysis showed:

|   | Actual | Theoretical |
|---|---|---|
| C | 62.36 | 62.45 |
| H | 5.44 | 5.45 |
| S | 28.40 | 29.10 |

EXAMPLE II.—PROPARGYL SULFIDE AS A CORROSION INHIBITOR

A series of standardized tests was run in which the sulfide was dissolved in aqueous hydrochloric acid. Identical coupons of AISI–1020 mild steel were suspended in the acid. After 16 hrs. the coupons were removed, washed, dried, and weighed to determine the amount of metal removed by corrosion. Some typical results thus obtained are shown in the following tables.

Table I
EFFECT OF CONCENTRATION OF PROPARGYL SULFIDE

| Sulfide, percent | Corrosion Rate, lbs./sq. ft./day | |
|---|---|---|
|  | 5 percent HCl, 75 °F. | 15 percent HCl, 200 °F. |
| 0.000 | 0.010 | >1 |
| .010 | .00060 |  |
| .025 | .00020 |  |
| .050 | .00010 |  |
| .100 | .00007 |  |
| .200 |  | 0.365 |
| .300 |  | .015 |
| .400 |  | .007 |
|  |  | .005 |

As may be seen from Table I, in dilute acid at ordinary temperature, a high degree of protection is provided by very low concentrations of the sulfide. Higher temperatures or acid concentrations require somewhat more inhibitor, as is shown by Table II. Little or no additional protection is obtained by use of amounts of sulfide in excess of about 1 percent.

Table II
EFFECT OF TEMPERATURE AND ACID CONCENTRATION ON CORROSION INHIBITION BY 0.4 PERCENT OF PROPARGYL SULFIDE IN HCl

| Temperature, °F. | Corrosion Rate, lb./sq. ft./day | |
|---|---|---|
|  | 10 percent HCl | 15 percent HCl |
| 150 | 0.0007 |  |
| 175 | .0007 | 0.0008 |
| 200 | .0014 | .0050 |

The effectiveness of propargyl sulfide in inhibiting corrosion by various acids at room temperature is illustrated in Table III.

Table III
CORROSION RATES OF VARIOUS ACIDS AT 5 PERCENT CONCENTRATION WITH AND WITHOUT INHIBITOR

| Acid | Sulfide Inhibitor (percent) | Corrosion Rate, lb./sq. ft./day |
|---|---|---|
| Acetic | 0.0 | 0.00561 |
| Do | 0.4 | .00000 |
| Sulfuric | 0.0 | .09490 |
| Do | 0.4 | .00007 |
| Phosphoric | 0.0 | .05900 |
| Do | 0.4 | .00032 |

Other non-oxidizing acids are inhibited by propargyl sulfide similarly to those shown in Table III. Likewise, other types of steel, iron and ferrous metals are protected from corrosion by aqueous non-oxidizing acids by propargyl sulfide.

We claim:
1. A composition consisting essentially of an aqueous non-oxidizing acid and, as a corrosion inhibitor therefor, propargyl sulfide.
2. A composition as in claim 1 wherein the acid is hydrochloric acid.

References Cited in the file of this patent

UNITED STATES PATENTS 2,707,714   Conklin et al. _____ May 3, 1955